United States Patent
Brown et al.

(10) Patent No.: US 11,140,428 B2
(45) Date of Patent: *Oct. 5, 2021

(54) VIDEO ANALYTICS SYSTEM

(71) Applicant: Mux, Inc., San Francisco, CA (US)

(72) Inventors: Adam Brown, Oakland, CA (US); Jonathan Dahl, San Francisco, CA (US); Steven Heffernan, San Francisco, CA (US); Justin Sanford, San Francisco, CA (US); Matthew Ward, San Francisco, CA (US); Scott Kidder, Benicia, CA (US); Benjamin Dodson, San Francisco, CA (US); Alex Diehl, San Francisco, CA (US)

(73) Assignee: Mux, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,659

(22) Filed: Sep. 1, 2020

(65) Prior Publication Data

US 2020/0404351 A1 Dec. 24, 2020

Related U.S. Application Data

(63) Continuation of application No. 15/875,796, filed on Jan. 19, 2018, now Pat. No. 10,798,434.

(51) Int. Cl.
*H04N 21/24* (2011.01)
*H04N 21/4425* (2011.01)
*H04N 21/647* (2011.01)

(52) U.S. Cl.
CPC ..... *H04N 21/2407* (2013.01); *H04N 21/4425* (2013.01); *H04N 21/64723* (2013.01)

(58) Field of Classification Search
CPC .......... H04N 21/2407; H04N 21/4425; H04N 21/64723
See application file for complete search history.

(56) References Cited

U.S. PATENT DOCUMENTS

| | | | |
|---|---|---|---|
| 2014/0040015 A1* | 2/2014 | Haley | G06Q 30/0242 705/14.45 |
| 2015/0067185 A1* | 3/2015 | Tamblin | H04N 21/2407 709/231 |
| 2017/0085634 A1* | 3/2017 | Guney | G06F 16/24554 |
| 2017/0250855 A1* | 8/2017 | Patil | H04L 41/064 |

* cited by examiner

*Primary Examiner* — Nicholas T Corbo
(74) *Attorney, Agent, or Firm* — Run8 Patent Group, LLC; Peter Miller; Alex R. Flake

(57) ABSTRACT

A video monitoring system can include multiple collectors to receive video beacon data from multiple video monitoring interface modules. At least one beacon stream is connected to receive data from multiple collectors. A processing module receives the beacon stream and provides a real-time event stream used for real-time data analysis and a video view stream used for long-term data analysis.

20 Claims, 10 Drawing Sheets

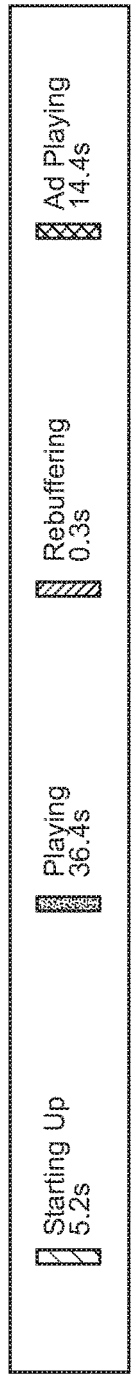
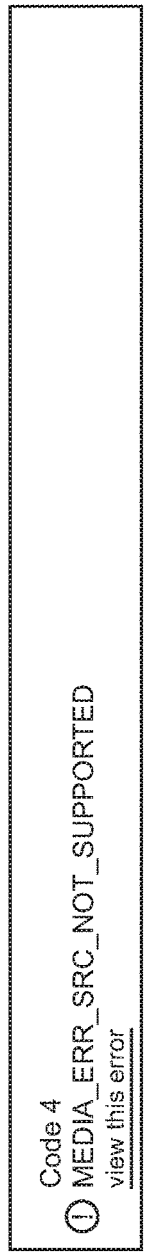
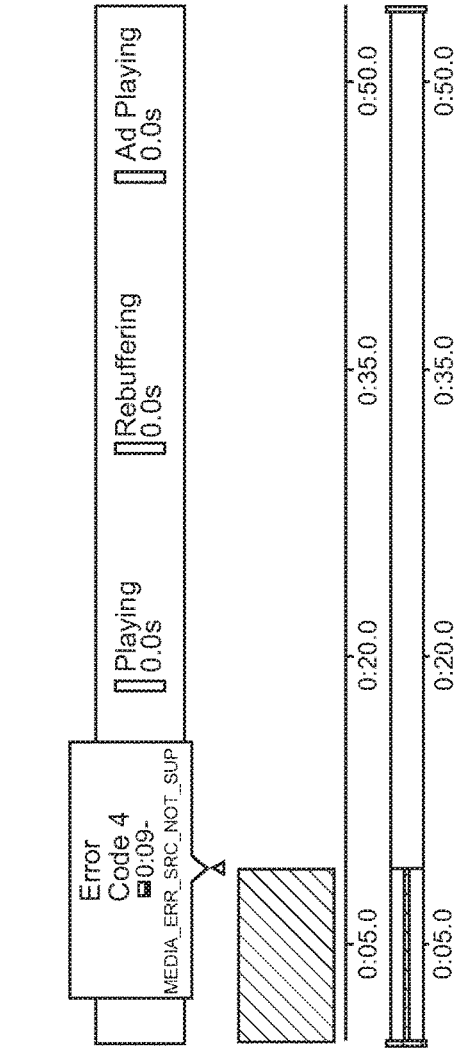
Fig. 9A
Fig. 9B

VIDEO ANALYTICS SYSTEM

CROSS-REFERENCE TO RELATED APPLICATIONS

This application is a continuation application of U.S. patent application Ser. No. 15/875,796, filed on 19 Jan. 2018, which is hereby incorporated in its entirety by this reference.

TECHNICAL FIELD

The present disclosure relates to a video monitoring and analytics systems, and more specifically to a system for real-time data capture of information relating to video playback on video playback platforms.

BACKGROUND AND SUMMARY

Streaming video, movies, music, news, and business or personal communications are increasingly provided to users by a wide range of devices that are connected to a complex range of networks. As compared to broadcast cable or similar dedicated media distribution system, ensuring that this content is timely provided, with needed quality, can be challenging. For example, a poor-quality viewing experience for typical social media user on a smartphone, tablet, or personal computer can result from a number of factors beyond the control of a content provider, including inadequate hardware, operating systems or players having legacy software that do not have necessary updates, or poor wired or wireless network topology. However, in many situations, such hardware, software, or network limitations can be compensated for by appropriate quality adjustments to provided bitrate, video resolution, frame rates, or buffering times. In such an environment, it is valuable to have the capability to quickly determine whether a viewing experience is adequate for users, and make necessary adjustments to video content or players to provide the best possible viewing.

In some embodiments, such a novel video monitoring system can include multiple collectors to receive video beacon data from multiple video monitoring interface modules. A beacon stream can be connected to receive data from multiple collectors and a processing module receives the beacon stream and provides a real-time event stream used for real-time data analysis. A separate video view stream also derived from the beacon stream is used for long-term data storage and deeper data analysis. In some embodiments an alert module is connected to the real-time event stream. The alert module can be adaptively configured to modify alert types and statistical thresholds. In other embodiments, a bot or crawler-detection module can be used to determine errors due to bot or crawler activity.

In other embodiments, the video view stream can be connected to a database writer. A connected database system (including database writer) can include a slim database supporting data required to respond to API requests from a customer interface module, as well as a view database supporting data collected from each available data view. Metadata information about individual events that define the available data view. The database system can also include an aggregation processing cluster for pre-computing aggregated data. A hashed combination of internal customer ID and names of the columns that compose an aggregate are used to partition a dataset into shards.

In another novel described embodiment, a video monitoring system includes a local video monitoring interface module to provide local video data. The video data can be sent to a remote video monitor system connectable to receive data from the local video monitoring interface. An automated video request identification module included in the remote video monitor system is configured to identify automated video requests that can generate video errors. Identification can be based on IP address, geographic origin, software version, vendor information, or characteristic viewing request patterns.

Another embodiment of a video monitoring system includes a local video monitoring interface module to provide local video error data and a remote video monitor system connectable to receive error data from the local video monitoring interface. An error history module is included in the remote video monitor system and is configured to store error history. A statistical anomaly module is used to compare received error data and error history to determine statistical anomalies. A machine learning module can be used to receive information from the statistical anomaly module and determine whether to send an error alert. In some embodiments, the machine learning module is able to adaptively set error rate standards for sending an error alert. The machine learning module can be a binary or other statistical classifier, as well as a deep convolutional or neural network.

In another embodiment a video monitoring system includes a local video monitoring interface module to provide local video data from a video player, the interface module having an associated viewer experience rating system a remote video monitor system is connectable to receive data from the local video monitoring interface and an error tracking system is used to adjust tracked error categories based on information provided by the viewer experience rating system. In some embodiments, errors are deliberately injected into the video player, while in others a placebo quality improvement button is associated with the video player. Video attributes or video player operating parameters can be adjusted at least in part due to viewer experience rating.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 9A-C illustrate various exemplary screen shots for a customer user interface to a video analytics system.

DETAILED DESCRIPTION

Figure 1:
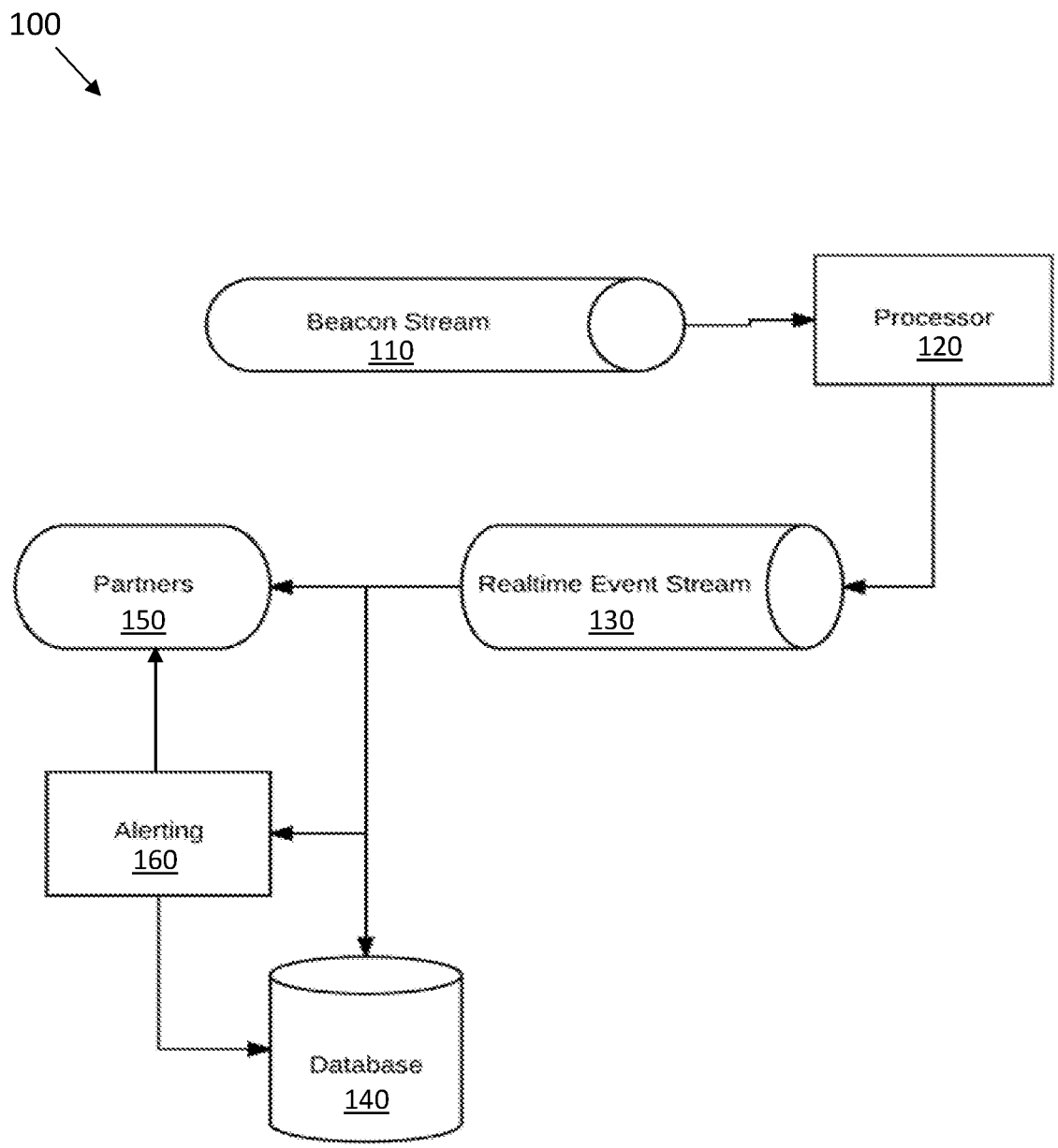
FIG. 1 generally illustrates one embodiment of a video analytics system.

FIG. 1 generally illustrates one embodiment of a real-time video monitoring and analytics system 100. This system 100 can evaluate completed video views in real or near real-time, comparing selected performance metrics against those of other video views across numerous breakdown classifications, including video title, browser, country, and more. In effect, system 100 is stream-processing application that applies a real-time map-reduce operation across multiple breakdown dimensions. Once a sufficient number of views have been collected (e.g. 100 views), a summary metric (e.g. error-rate) can be calculated for the views. The summary metric is compared against previous values for that customer account to determine whether it suggests a problem. Advantageously, system 100 does not require completion of a video before data analysis. Instead of requiring, for example, that data analytics for a thousand or so hour long content views must wait for an hour of viewing time to expire, system 100 can begin immediately providing useful information, leading to much lower latency in detecting problems and providing needed alerts.

This system is illustrated in FIG. 1, which shows a beacon stream 110 connected to a processor system 120. The beacon stream includes data payloads from large numbers of video clients that each support a video analytics plugin or module. This data can be collected as a real-time event stream 130 that can be stored in database 140, immediately viewed by partners 150 interested in the information, or cause automated creation of alerts in an alerting system 160. Alerts can be stored in the database 140 for later retrieval, or immediately provided to partners 150. A wide range of content can have data metrics tracked by the described system. For example, movies, commercial or user generated videos, music, sports, games or the like can have associated data analytics. This content can be viewed on smartphones, tablets, personal computers, televisions, in-home or business projection systems, movie theaters, and augmented or virtual reality systems. Players can be dedicated apps or applications, browser plugins or addons, set top boxes or view cast systems, or any other suitable video viewing system that can support collection and transmission of content related data.

The beacon stream 110 can include collective information from video client players or viewers. For example, plugins, addons, or integrated software can be provided for players such as HTML5 Video Element, Video.js, Brightcove, Ooyala, Bitmovin, Chromecast, THEOplayer, JW Player, iOS, and Android. The players can provide technical and content data such as browser type, browser version, country, operating system, OS version, player name, player version, player software, player source type, source hostname, stream type, video title, video series, and content source. Hardware, network, and site or owner-specific data such as CPU and motherboard identity, operating frequency, connection type (e.g. wired or wireless), connection speed, packet drop or loss metrics, IP address, ISP, geographic location, and owner identity can be provided. Tracked data metrics can include an overall viewing performance score, number of playback failures, time to first frame, number of exits before video start, player load time, page load time, rebuffer percentage, rebuffer frequency, seek time, upscale percentage, and downscale percentage. In one embodiment, such second-scale beacon data is provided every 1 to 59 seconds. In other embodiments, minute-scale beacon data (e.g. 1 to 59 minutes) can be provided. In still other embodiments, frequency of beacon data transfer can be adaptively increased or decreased to match available content, player, or network resources. For example, a 1-5 second beacon might be provided for tablet player predominantly providing social media clip views, while a set-top box player (e.g. Roku or Amazon Fire) may only need to provide beacon data every 5-30 seconds. Advantageously, this procedure for beacon streaming can be used to quickly identify a spike in error-rates occurring in the first minute of playing video content. This speed favorably compares to a system that waits until video completion and might need more than an hour to provide an alert, a latency that is not suitable for a real-time alerting system.

Figure 2:
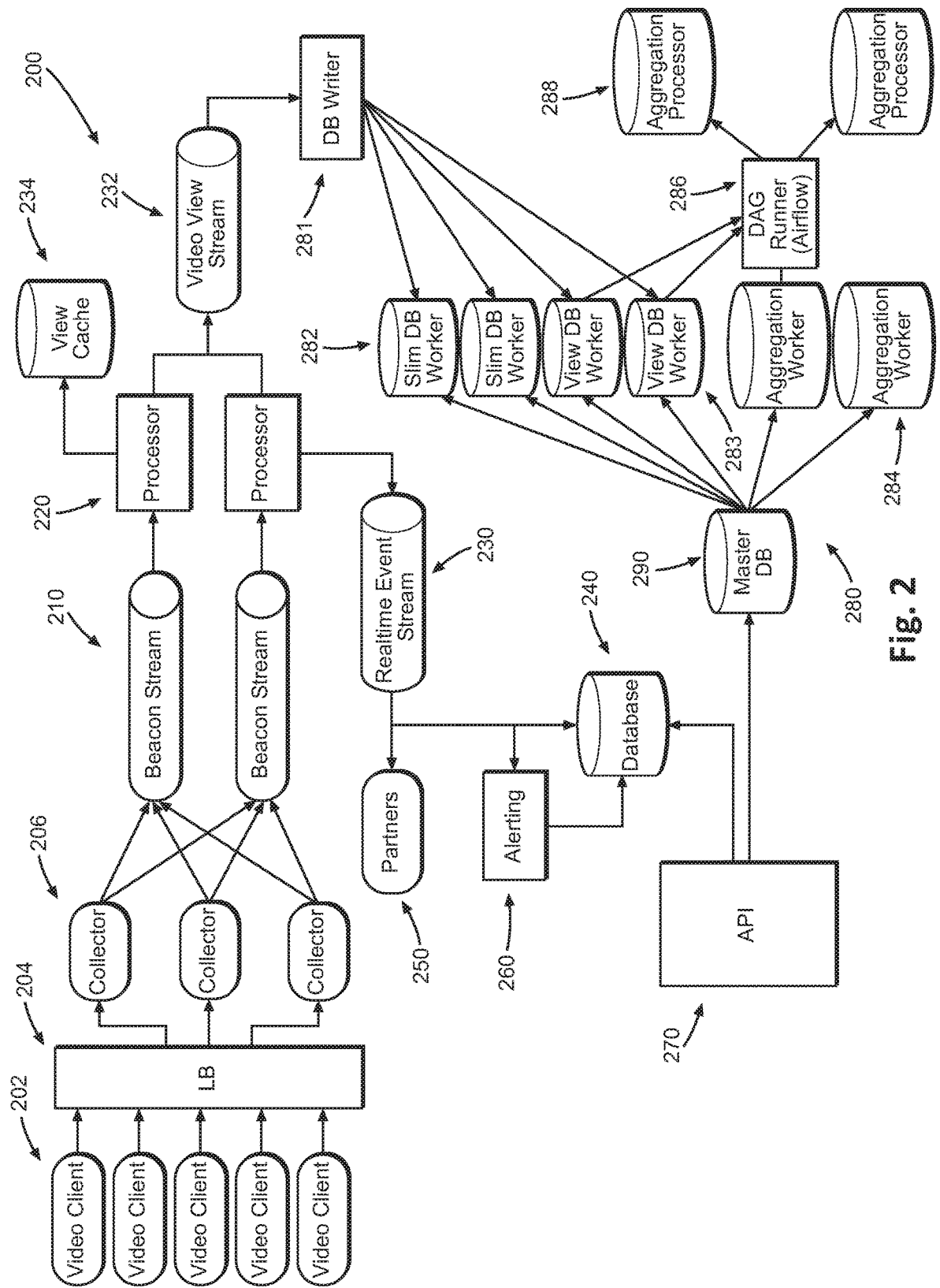
FIG. 2 illustrates in more detail an embodiment of a video analytics system.

FIG. 2 illustrates in greater detail a system 200 similar to that discussed with respect to FIG. 1. Multiple video clients 202 are connected via the Internet or other suitable network connection to a load balancer 204. The load balancer 204 feeds into multiple collectors 206 which provide limited categorization and group the received data in one or more beacon streams 210. The beacon streams 210 are connected to a processor system 220, with all beacons from a single local module being directed to the same respective processors of the processor system 220. The processor system 220 further filters, organizes, begin statistical compilation, and directs the organized data into a real-time event stream 230 and a video view stream 232. The processor system 220 is supported by a view cache 234.

Real-time event stream 230 can be stored in a real-time database 240, immediately viewed by partners 250 interested in the information, or cause automated creation of alerts in an alerting system 260. Alerts can be stored in the database 240 for later retrieval, or immediately provided to partners 250 via calls to a customer interface module 270.

Longer term and more complex information can be stored and processed in database system 280. Database system 280 includes a master database 290 connected to customer interface module 270. Data is provided via the video view stream 232 connection to a database writer 281. The database writer 281 provides data to both slim view databases 282 and video view databases 283. The slim view databases 282 contain the data required to quickly respond to certain types of API requests (via customer interface module 270) for data about views, before data has been aggregated and fully processed. The video view databases 283 instances contain all data collected about each view, as well as metadata information about the individual events that define that view. For commonly needed data, the master database 290 can receive information from aggregation workers 284 directed by a directed acyclic graph (DAG) workflow system 286 and supporting aggregation processors 288.

Figure 3:
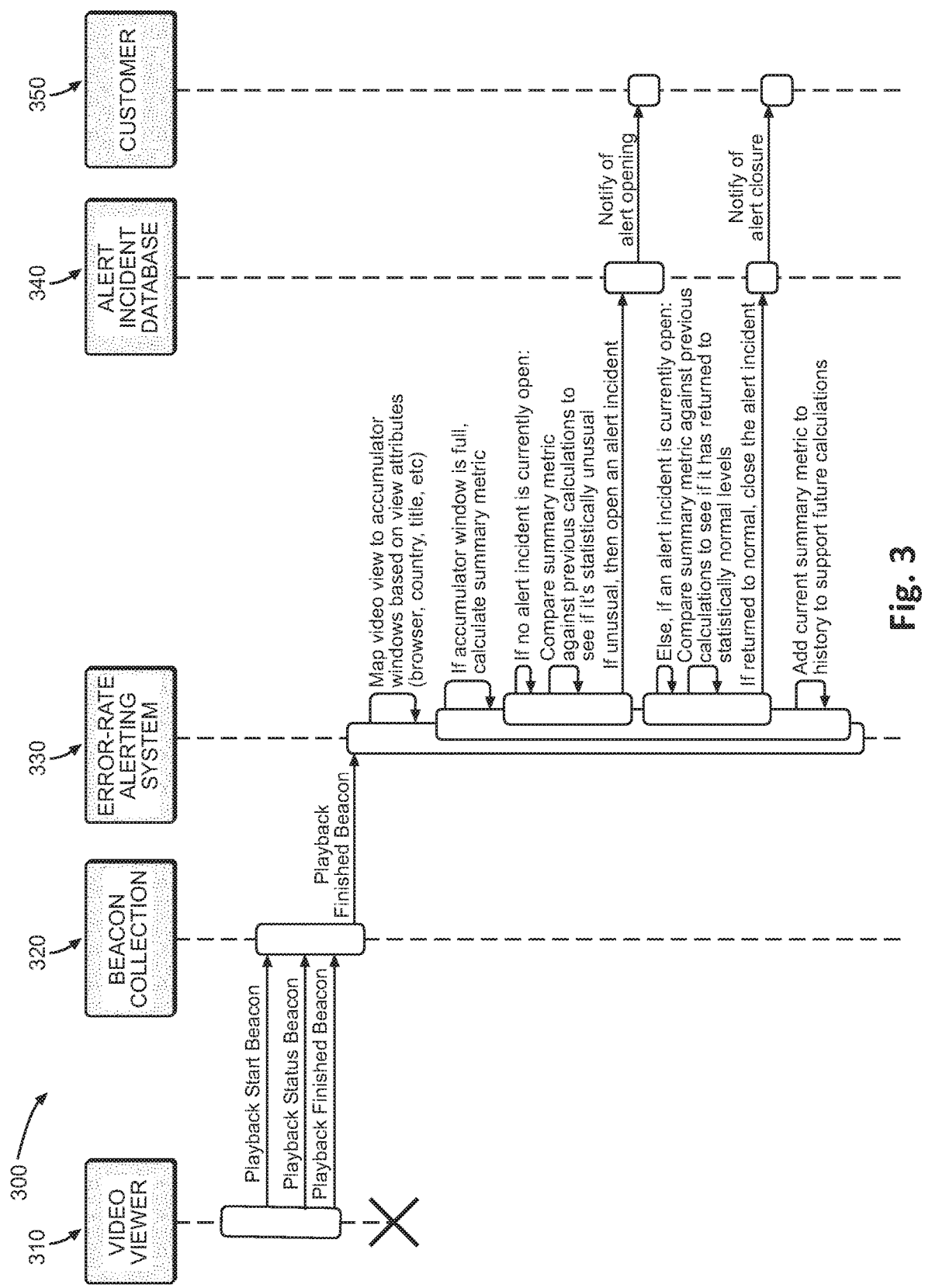
FIG. 3 illustrates one embodiment of a method for processing data by a video analytics system.

FIG. 3 illustrates operation of certain aspects of a real-time video monitoring system 300. A video viewer 310 with associated video data beacon sends data upon playback start. Additional status data is sent at predetermined or adaptively determined time intervals (typical 1-10 seconds) until video playback ends, causing playback finished beacon data to be sent. The beacon data is collected by beacon collection system 320, which can include dedicated local or remote servers, virtual server systems, cloud systems or the like.

When the playback finished beacon data is received, a real-time error alert system is invoked to provide preliminary data concerning error events and other view attributes. In operation, received video views can be continuously mapped to various easily determined view attributes such as browser type, country of viewing, or title of video. At determined intervals, or when the accumulator window is full, various summary metrics can be calculated such as number of particular browser types used in each country, or number of video titles completely watched. If no alert incident is currently open, summary metrics can be compared against previous history to see if any statistically unusual situations have developed. If there is statistically unusual behavior, an alert incident can be opened and preserved in an alert incident database 340. A customer 350 can be alerted, allowing them to take appropriate manually or automatically determined actions in near real-time. If an alert incident is already open, summary metrics can be compared against previous history to see if the identified statistically unusual situations has returned to historically normal levels. If it has, the alert incident can be closed, with the alert incident database updated and notification of alert closure provided to customer 350. Otherwise, the summary metrics are added to the history of the error-rate alert system 330 and processing continues.

Figure 4:
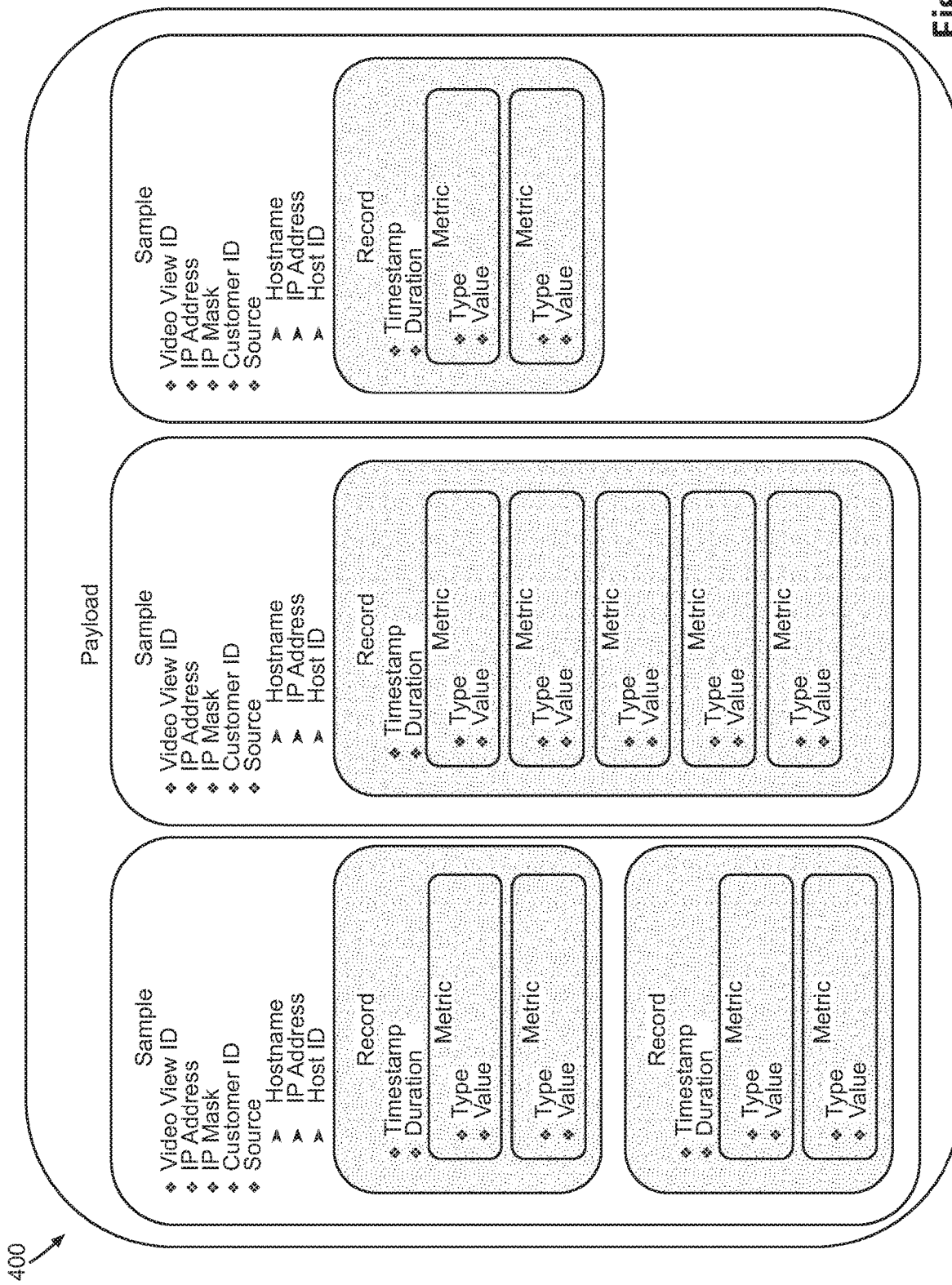
FIG. 4 illustrates one example of a data payload for processing by a video analytics system.

Beacon derived data can be grouped into various payload data packages as illustrated with respect to FIG. 4. For example, depending on designated data to be tracked, customer interest, or bandwidth or processing limitations, various levels of data detail can be provided. For example, data and metadata for a particular customer can require video view ID, IP address, IP mask, customer ID, and video source (as identified through hostname, IP address, and host ID). One or more data records can be included, with a timestamp, duration, and type and value of a customer requested metric being included.

Providing accurate real-time or near real-time statistics can involve a need for identifying outliers, bad data, or systemic errors such as might be caused by interaction of video players and systems with robots (bots) or crawlers. Web crawlers and scrapers are a class of software designed to follow links in web content and scan large sections of the Internet. Crawlers are often used to extract metadata from web content to support useful activities like web searches with search engines at Google, Facebook, or Microsoft often relying on data gathered by proprietary crawlers. Scrapers can be less benign, often downloading entire web pages and their resources including videos, images, and CSS.

Video error-rates and other performance metrics can be influenced by bots that crawl the web. Bots can trigger video playback in the browser engine, leading to video playback metrics being sent even though no user has requested video playback. Bots often have a higher error-rate compared to human views, and have the potential to inflate aggregate error-rates or provide misleading data. For example, web crawlers and scrapers often use browser user-agent strings with software versions that that lag behind versions of software they are emulating, which in effect misidentifies browser version. As another example, JavaScript crawlers often depend on a headless browser like PhantomJS and the Chromium Embedded Framework (CEF). Such crawlers using PhantomJS can trigger the creation of video-views in real-time video monitoring system such as described herein, with those views will likely registering as an error. This is extremely problematic because a wave of crawlers accessing the website of a customer can trigger an unwarranted alert or a flood of error-views. As another example of issues relating to crawlers, many crawlers often run in environments with self-imposed CPU and network throughput constraints. This is mutually beneficial to the crawler operator and the site being crawled. It enables the crawler to simultaneously access multiple sites while not overwhelming the site network and server resources. However, these constraints have the potential to distort performance metrics for video playback if the crawler happens to trigger the loading of an embedded video, while still limiting processor or network availability. Network throughput limits could lead to extremely poor measurements for key metrics like time-to-first-frame (TTFF). In effect, automated web monitoring or data capture bots and crawlers have the potential to trigger video playback and influence performance metrics unless steps are taken to exclude them.

Figure 5:
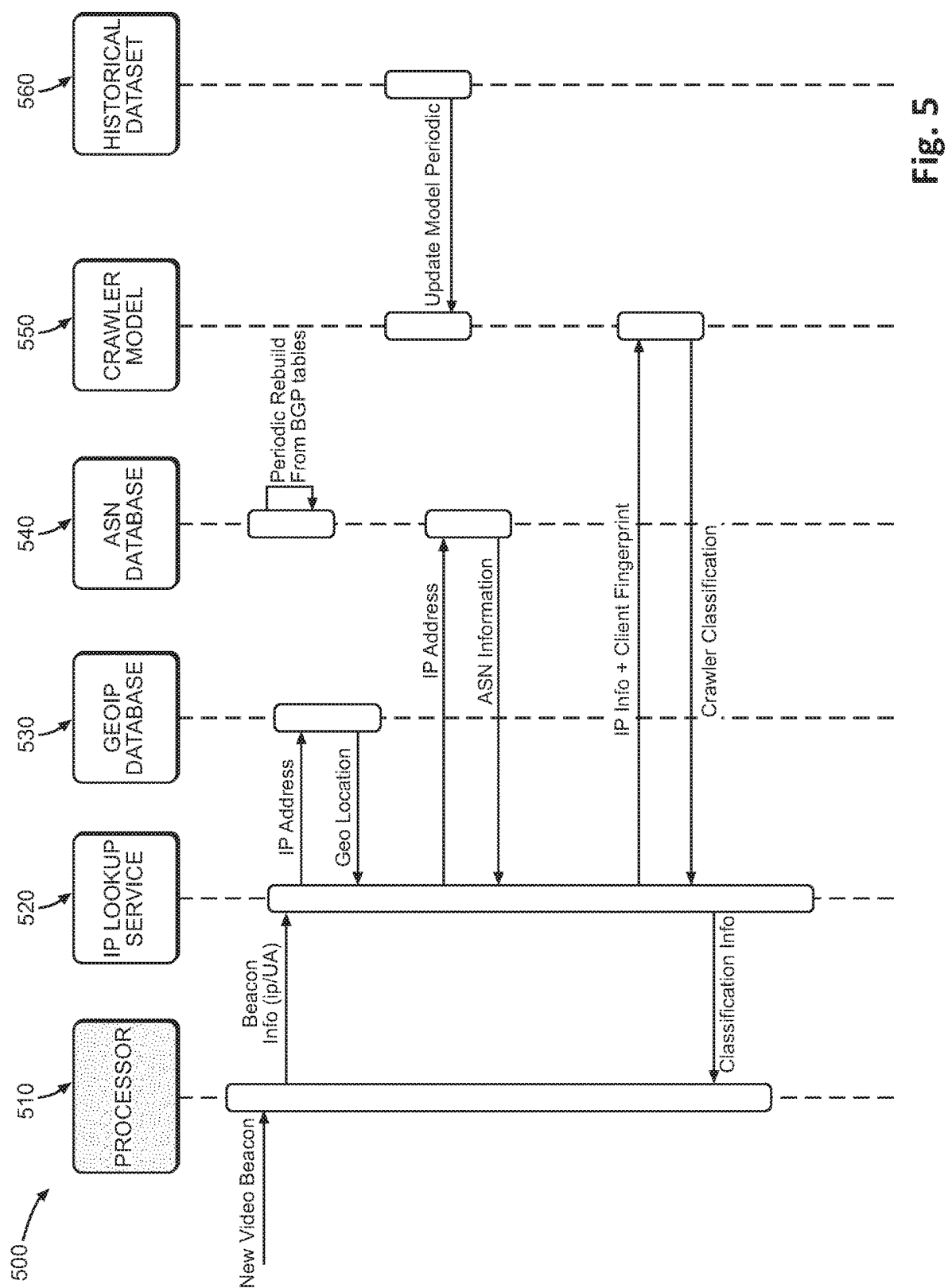
FIG. 5 illustrates a bot/crawler detection procedure.

As seen with respect to FIG. 5, in one embodiment a bot or crawler-detection procedure/module 500 can be used in a processing flow that inspects several metrics to determine whether the view came from a bot or crawler. If the view is suspected as coming from a bot or crawler, then special steps are taken to exclude it from alerting calculations and aggregate metrics. Bot and crawler detection begins with receipt of a new video beacon by a processor 510. Beacon information is checked against an IP lookup service 520, geographic IP database 530, and an Autonomous System Network (ASN) database 540 that maps IPv4 and IPv6 addresses to ASN. The ASN database can be also be updated with Border Gateway Protocol prefix information. Further information can be provided by a crawler model 550 and historical dataset 550 that help in determining identifying signatures for bots or crawlers, along with frequency and IP or geographic associations. This information can be collected together and used to provide a basis for classification of crawler type, and likely associated errors. As new crawlers are found, or error associations change, the classification information used by the processor 510 can be updated, added, or otherwise modified.

In some embodiments, machine learning (ML) can be used to classify bots or crawlers. ML methods can include, but are not limited to neural networks, deep neural networks, convolutional narrow networks, recurrent neural networks, boosted tree networks or other suitable machine learning modules or system. Machine learning can be supervised or unsupervised. Multiple systems or types of systems can be used. Well-defined learning tasks can be developed to precisely define a video related attribute or function to be learned. Data can be automatically cleaned and put in a suitable form for usability by the ML algorithm, and initial and periodic updates to training data can be necessary.

In one preferred embodiment, multiple models for identifying bots or crawlers can be used, with the best performing model being selectable as a consensus model. The consensus model can be periodically updated as new bots or crawlers are found, or parameters or training data for available models are adjusted. The models can be used to identify bot or crawler intent, and data on bot or crawler view can be segregated from user viewing data.

Figure 6:
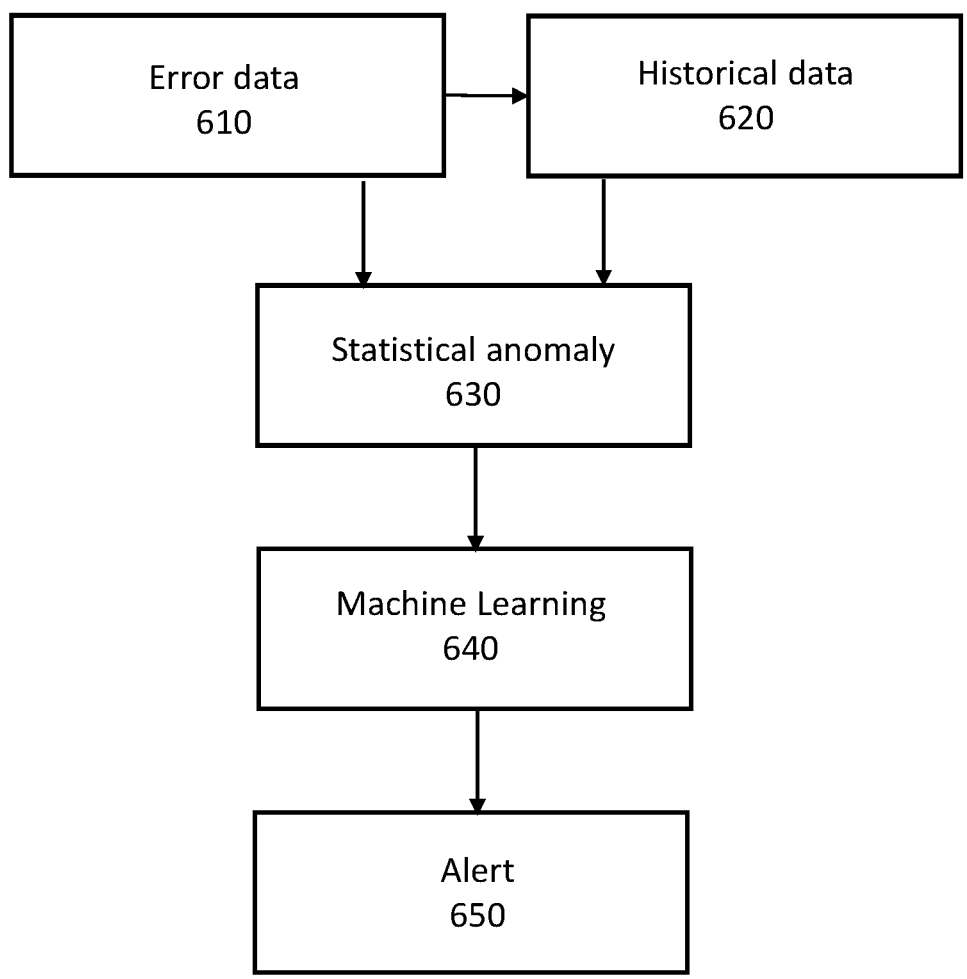
FIG. 6 illustrates a procedure for adaptive error rate handling.

FIG. 6 illustrates another embodiment 600 of a real-time video monitoring system that supports automated adaptive alerts. Defining and maintaining customer relevant error rates is tedious and prone to obsolescence as hardware, software, and network connectivity change. For error rate timeseries with evolving patterns, thresholds should be calibrated to reflect their most recent state. Data-driven thresholds require periodic readjustment. This approach emphasizes the importance of monitoring as a process and yields high rates of accuracy.

In the embodiment illustrated in FIG. 6, error data 610 is collected as historical data 620. For example, each error-rate summary metric can be saved with up to 20,000 error-rate calculations that preceded it. The error data 610 and historical data 620 is passed to a statistical anomaly module 630 that identifies potential statistical anomalies and passes the relevant information a machine learning system 640. If the alert is for an error class that customers can benefit from having an alert, and the error rate statistically significant, an alert 650 can be sent to a customer.

Similar to machine learning systems discussed in connection with bot and crawler identification, ML methods for providing adaptive alerts can include, but are not limited to neural networks, deep neural networks, convolutional narrow networks, recurrent neural networks, boosted tree networks or other suitable machine learning modules or system. Machine learning can be supervised or unsupervised. Multiple systems or types of systems can be used. One embodiment uses a recurrent neural network (RNN) to identify anomalies in error-rate. The RNN can be created with an autoencoder that identifies key features in predicting error-rates. Data would move to the autoencoder offline, which encodes the key features and moves it an online model RNN model using Long Short Term Memory (LSTM) cells. The RNN model can predict the number of errors, and if the divergence between prediction and observed is large enough, an alert is triggered. In another embodiment, a statistical classifier is used to identify important alert conditions that match characteristics of historical alerts that affected large numbers of viewers. A statistical classifier uses predefined categories, and is used to categorize new probabilistic observations into said categories. When there are only two categories the problem is known as statistical binary classification. Statistical binary classification can include decision trees, random forests, Bayesian networks, support vector machines, neural networks, and systems that use logistic regression. Typically, the type of classifier used depends on the number of observations, the dimensionality of the feature vector, the expected noise in the data, and other factors.

Figure 7:
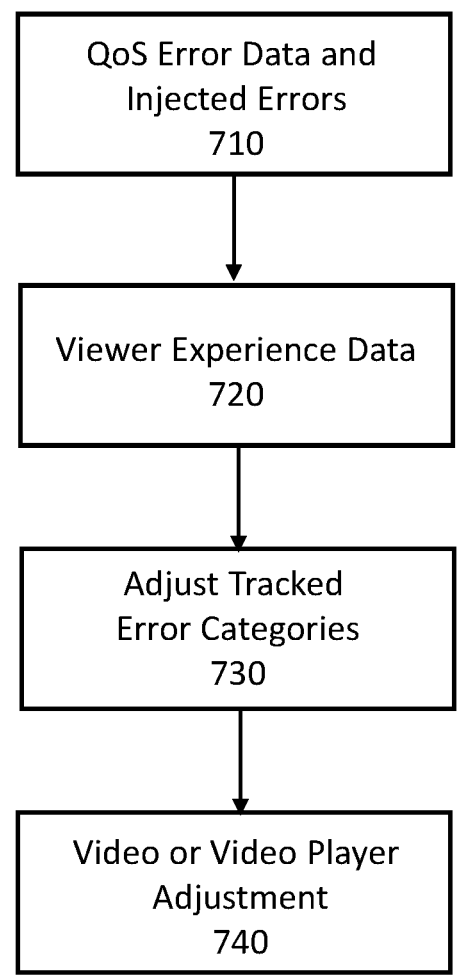
FIG. 7 illustrates a procedure for viewer experience tracking.

FIG. 7 illustrates another embodiment 700 of a real-time video monitoring system that supports viewer experience tracking. Quality of Service (QoS) errors and/or deliberately injected errors 710 act to mar or reduce a user's viewer experience. Such artificial impairment by injecting errors can allow experiments to test importance of single errors, types of errors, or error groupings. Using after viewing polls, online questionnaires, surveys, or the like, viewer experience data 720 is gathered. In some embodiments features that ostensibly improve quality can be provided to indirectly give useful feedback. For example, use of placebo, non-operational, or placebo buttons, toggles, triggers, or the like can provide non-written feedback. In effect, the more often a placebo "quality improvement" button is pressed, the worse the viewing experience. Based on viewing experience information, tracked error categories (730) can be deleted, added, or adjusted to provide better matching between viewer experience and QoS errors that can tracked in real-time. In effect, viewing satisfaction can be more accurately correlated with trackable errors. Ultimately changes to video distribution or attributes can be made, as well as changes or adjustments to a video player, to improve viewer experience.

In one embodiment a user's viewing experience can fall into into three categories:

Satisfied (1): the user was satisfied with the experience
Tolerating (0.5): the user tolerated the experience, and was neither satisfied nor frustrated
Frustrated (0): the user was frustrated with the experience.
Various scores can be determined, including:
Overall Score: the min of scores 2-5
Playback Success: 1 if playback succeeds; 0 if playback fails before the user quits watching video.

Startup Time: 1 if time to first frame is under 2 seconds; 0.5 if time to first frame is under 8 seconds; 0 time to first frame is over 8 seconds.

Rebuffering: 1 if the view had no rebuffering. 0.5 if rebuffering percentage is 0%-12% AND rebuffering count is 1-4. 0 if rebuffering percentage of more than 12% or rebuffering count is 5+.

Playback Quality: 1 if number of source pixels is at least 50% of the number of display pixels. 0.5 if the number of source pixels 25%-50% of the number of display pixels. 0 if <25%.

An aggregate score can be determined by taking all of the individual view scores and dividing it by the number of views. In many situations, a single aggregate score is all that is required for most users of a real-time monitoring systems.

Figure 8:
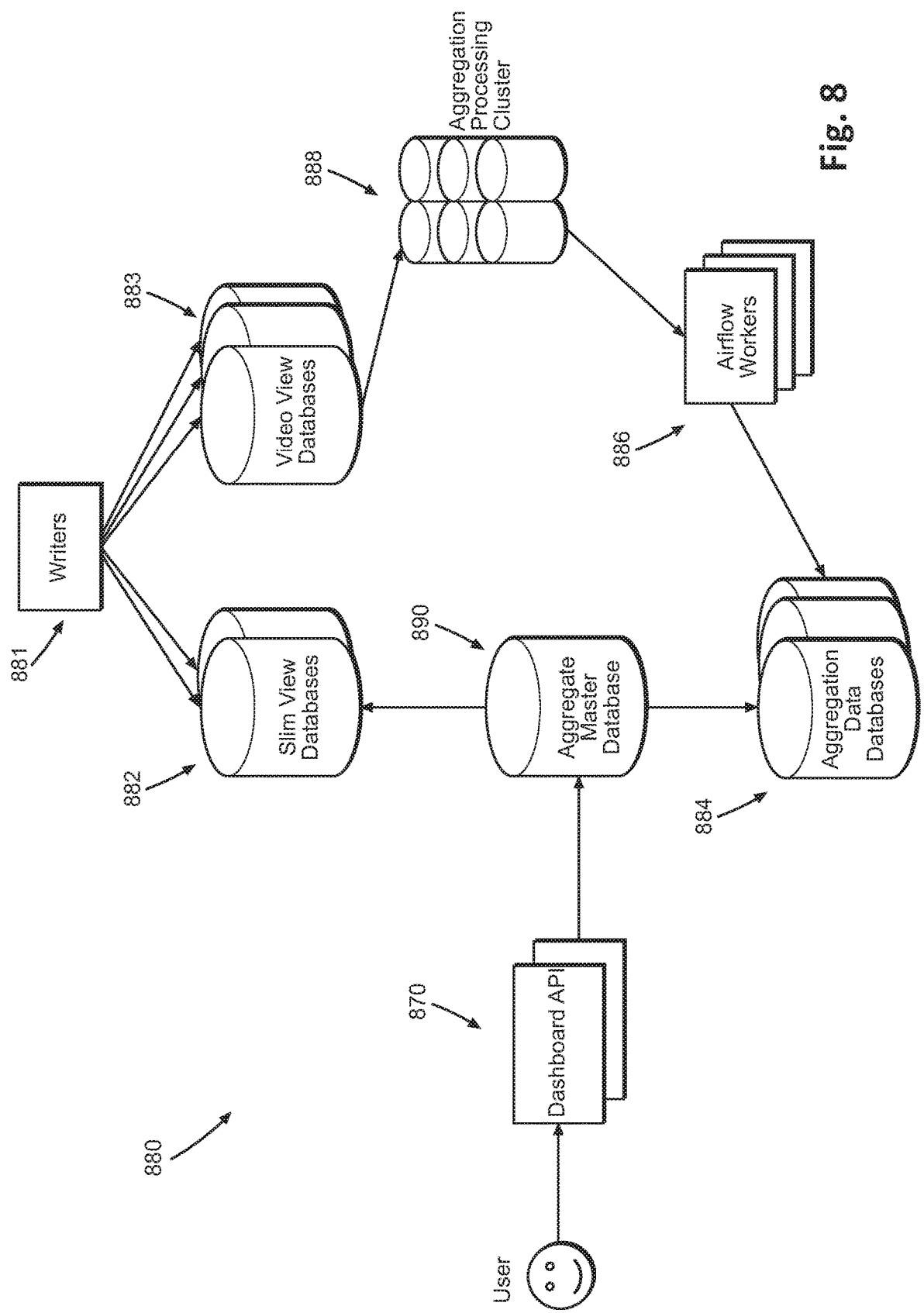
FIG. 8 illustrates one embodiment of a database system for a real-time and near real-time video analytics system.

In one alternative embodiment illustrated with respect to FIG. 8, a real-time video monitoring system can be supported by a database system 880 that includes an aggregate master database 890 connected to customer interface module 870 having a dashboard API access. Processed data identified with unique view IDs is supplied to database writer 881. The database writer 881 provides data to both slim view databases 882 and video view databases 883. The slim view databases 882 contain the data required to respond to API requests (via customer interface module 870) for data about views. The video view databases 883 instances contain all data collected about each view, as well as metadata information about the individual events that define that view. Typically, all of these servers are memory optimized cloud instances with, for example, hardware support by 4 CPU cores and about 30 GB of available memory.

On an hourly cadence (for example, 1-2 hours behind current time), a scheduled process copies data from the video view databases 883 onto a set of database workers referred to as the aggregation processing cluster 888. The aggregation processing cluster 888 is responsible for computing the pre-aggregated set of data that allow quick response to API requests via customer interface module 870. CPU intensive instances through cloud providers (each instance has 8 cores and ~15 GB of memory) can support the aggregation processing cluster 888. A process is followed to generate a list of all combinations of dimensional column combinations that need to be pre-aggregated, and then splits that list evenly across the available database instances. An example of a pre-aggregated combination is country code, operating system, and browser. Once all pre-aggregated data has been generated on the aggregation processing cluster 888, the resulting dataset can be transferred onto several instances of airflow workers 886. These instances run a set of scripts that sort the data set into thousands of individual files. The content of these files is determined by the partitioning scheme of the aggregation data database cluster. A hashed combination of internal customer ID and the names of the columns that compose the aggregate (e.g. country code, operating system, browser) can be used to partition the dataset into shards. The shards are then further partitioned into tables by customer ID (allowing enforcement of retention durations on a per customer basis). Once all data has been sorted into the appropriate files, these files are loaded into the aggregation master database 890 directly from the airflow workers 886. When a user interacts with the customer interface module 870 having a dashboard API access, requests for data are run. Stored procedures that live on the aggregate master database 890 are callable to access both the pre-aggregated data living on the aggregate master database 890 as well as the raw data located on the slim view databases 882. The aggregate master database 890 can combine the datasets from the two locations into a single result set, which is in turn passed back to a user through a suitable user interface.

Figure 9C:
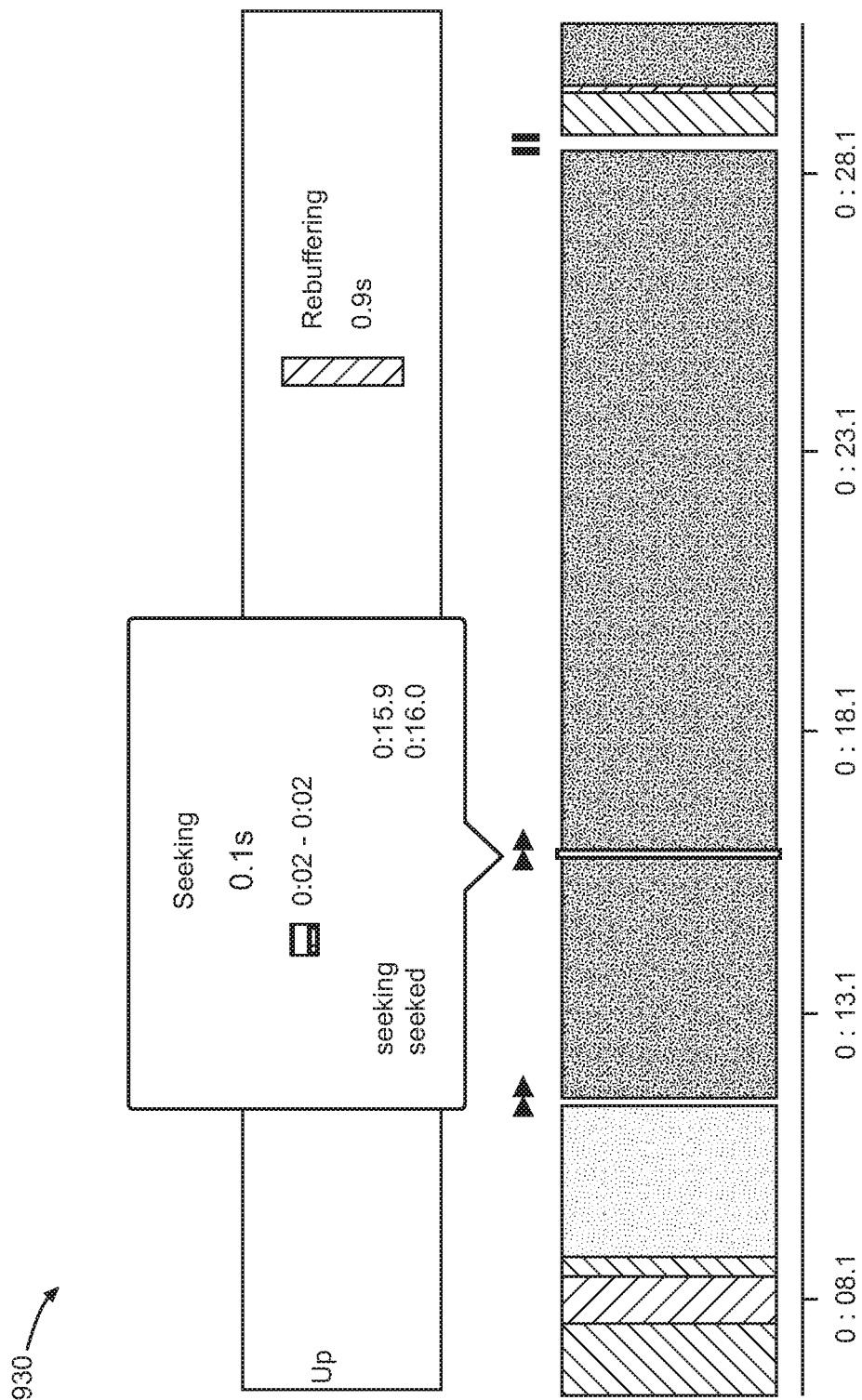

FIGS. 9A-C illustrate some example screenshots of graphical data presentation of generated result sets. For example, FIG. 9A illustrates various actions such as average start up time, play time, rebuffering time, and advertising play time. An x-axis is provided to indicate when events occurred in the video playback timeline.

FIG. 9B illustrates a mechanism for identifying errors or problems. A specific error that has occurred can be identified and support a callout with additional information. A triangle symbol on the video playback timeline will mark where and when it happened. Hovering over a bar in the video playback timeline will display its event category type, duration, and playback time. Also included is a list of events that make up the event category block. The first event listed is the start event, and the last ends the current event category block.

FIG. 9C illustrates a graphical presentation of user initiated events such as pause and seek explicitly on the video playback timeline since such events can explain non-user initiated event behavior on the video playback timeline. For example, the video playback timeline may contain a high amount of startup events, but that may be caused by a user seeking or pausing frequently. Seeking and pause event category blocks are now marked with symbols above the main chart timeline.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

We claim:

1. A method for monitoring playback of a video over a network comprising:
   for each video player in a set of video players streaming the video during a first time period:
      receiving a set of beacon data from a video player in the set of video players, the set of beacon data:
         generated by a video interface module of the video player in the set of video players; and
         comprising a set of tracked data metrics characterizing the video;
      classifying the set of beacon data as deriving from a user view based on the set of tracked data metrics and a crawler model; and
      in response to classifying the set of beacon data as deriving from the user view, aggregating the set of beacon data into a beacon stream;
   generating a real-time event stream based on the set of tracked data metrics of each set of beacon data in the beacon stream;
   calculating a summary metric based on the real-time event stream;
   comparing the summary metric to historical data for the summary metric;
   detecting a statistical anomaly based on the historical data for the summary metric; and
   in response to detecting the statistical anomaly, serving an alert indicating the summary metric and the statistical anomaly at an interface module.

2. The method of claim 1:
   wherein receiving the set of beacon data comprises receiving the set of beacon data comprising the set of tracked data metrics characterizing the video and comprising an operating frequency of a computational device executing the video player in the set of video players; and
   wherein classifying the set of beacon data as deriving from the user view based on the set of tracked data metrics and the crawler model comprises classifying the set of beacon data as deriving from the user view based on the operating frequency of the computational device executing the video player in the set of video players and the crawler model.

3. The method of claim 1:
   wherein receiving the set of beacon data comprises receiving the set of beacon data comprising the set of tracked data metrics characterizing the video and comprising an identifier of a computational device executing the video player in the set of video players; and
   wherein classifying the set of beacon data as deriving from the user view based on the set of tracked data metrics and the crawler model comprises classifying the set of beacon data as deriving from the user view based on the identifier of the computational device executing the video player in the set of video players and the crawler model.

4. The method of claim 1:
   wherein calculating the summary metric based on the real-time event stream comprises calculating an error rate based on the real-time event stream;
   wherein comparing the summary metric to historical data for the summary metric comprises comparing the error rate to historical data for the error rate;
   wherein detecting the statistical anomaly based on the historical data for the summary metric comprises detecting the statistical anomaly based on the historical data for the error rate; and
   wherein, in response to detecting the statistical anomaly, serving the alert indicating the summary metric and the statistical anomaly at the interface module comprises, in response to detecting the statistical anomaly, serving the alert indicating the error rate and the statistical anomaly at the interface module.

5. The method of claim 1:
   wherein calculating the summary metric based on the real-time event stream comprises calculating a number of rebuffering events based on the real-time event stream;
   wherein comparing the summary metric to historical data for the summary metric comprises comparing the number of rebuffering events to historical data for the number of rebuffering events;
   wherein detecting the statistical anomaly based on the historical data for the summary metric comprises detecting the statistical anomaly based on the historical data for the number of rebuffering events; and
   wherein, in response to detecting the statistical anomaly, serving the alert indicating the summary metric and the statistical anomaly at the interface module comprises, in response to detecting the statistical anomaly, serving the alert indicating the number of rebuffering events and the statistical anomaly at the interface module.

6. The method of claim 1:
   wherein calculating the summary metric based on the real-time event stream comprises calculating an average time-to-first-frame based on the real-time event stream;
   wherein comparing the summary metric to historical data for the summary metric comprises comparing the average time-to-first-frame to historical data for the average time-to-first-frame;
   wherein detecting the statistical anomaly based on the historical data for the summary metric comprises detecting the statistical anomaly based on the historical data for the average time-to-first-frame; and
   wherein, in response to detecting the statistical anomaly, serving the alert indicating the summary metric and the statistical anomaly at the interface module comprises, in response to detecting the statistical anomaly, serving the alert indicating the average time-to-first-frame and the statistical anomaly at the interface module.

7. The method of claim 1, wherein classifying the set of beacon data as deriving from the user view based on the set of tracked data metrics and the crawler model comprises:
   calculating an identifying signature for crawlers based on an historical dataset; and
   classifying the set of beacon data as deriving from the user view based on the set of tracked data metrics, the identifying signature, and the crawler model.

8. The method of claim 1:
   wherein detecting the statistical anomaly based on the historical data for the summary metric comprises detecting the statistical anomaly based on historical data for the summary metric and for a customer providing the video; and
   wherein, in response to detecting the statistical anomaly, serving the alert indicating the summary metric and the statistical anomaly at the interface module comprises, in response to detecting the statistical anomaly, serving the alert indicating the summary metric and the statistical anomaly at the interface module of the customer providing the video.

9. The method of claim 1, wherein detecting the statistical anomaly based on the historical data for the summary metric comprises detecting the statistical anomaly based on the historical data for the summary metric and a machine learning module.

10. The method of claim 9, wherein detecting the statistical anomaly based on the historical data for the summary metric and the machine learning module comprises:
    predicting a summary metric value based on the historical data for the summary metric via the machine learning module;
    calculating a deviation between the summary metric and the summary metric value; and
    in response to the deviation exceeding a threshold deviation, detecting the statistical anomaly.

11. The method of claim 9, wherein detecting the statistical anomaly based on the historical data for the summary metric and the machine learning module comprises:
    via the machine learning module, executing a binary classifier based on the summary metric, the historical data for the summary metric, the real-time event stream, and a historical dataset of real-time event streams; and
    detecting the statistical anomaly based on the binary classifier.

12. A method for monitoring playback of a video over a network comprising:
    for each video player in a set of video players streaming the video during a first time period:
        receiving a set of beacon data from a video player in the set of video players, the set of beacon data:
            generated by a video interface module of the video player in the set of video players; and
            comprising a set of tracked data metrics characterizing the video;
        classifying the set of beacon data as deriving from a user view based on the set of tracked data metrics and a crawler model;
        in response to classifying the set of beacon data as deriving from the user view, aggregating the set of beacon data into a beacon stream;
    generating a real-time event stream based on the set of tracked data metrics of each set of beacon data in the beacon stream;
    calculating a summary metric based on the real-time event stream; and
    in response to the summary metric exceeding a threshold, serving an alert at an interface module.

13. The method of claim 12, further comprising calculating the threshold based on historical data via a machine learning module.

14. The method of claim 12, wherein, in response to the summary metric exceeding the threshold, serving the alert at the interface module comprises, in response to the summary metric exceeding a preset threshold, serving the alert at the interface module.

15. A method for monitoring playback of a video over a network comprising, for a video player streaming the video and prior to completion of the video by the video player:
    at a first time, receiving a first set of beacon data from the video player, the first set of beacon data:
        generated by a video interface module of the video player; and
        comprising a first set of tracked data metrics characterizing the video at the first time;
    classifying the first set of beacon data as deriving from a user view based on the first set of tracked data metrics and a crawler model; and
    in response to classifying the first set of beacon data as deriving from the user view:
        generating a real-time event stream based on the first set of tracked data metrics;
        calculating a summary metric based on the real-time event stream; and
        serving a first alert at an interface module based on the summary metric.

16. The method of claim 15, further comprising, for the video player streaming the video and prior to completion of the video by the video player:
    at a second time succeeding the first time by a time interval, receiving a second set of beacon data from the video player, the second set of beacon data:
        generated by the video interface module of the video player; and
        comprising a second set of tracked data metrics characterizing the video at the second time;
    classifying the second set of beacon data as deriving from a user view based on the second set of tracked data metrics and the crawler model; and
    in response to classifying the second set of beacon data as deriving from the user view:
        aggregating the second set of tracked data metric into the real-time event stream;
        recalculating the summary metric based on the real-time event stream; and
        serving a second alert at the interface module based on the summary metric.

17. The method of claim 16, wherein, at the second time succeeding the first time by the time interval, receiving the second set of beacon data from the video player comprises, at the second time succeeding the first time by the time interval less than one minute in duration, receiving the second set of beacon data from the video player.

18. The method of claim 16, further comprising setting the time interval based on a player type of the video player.

19. The method of claim 18, wherein setting the time interval based on the player type of the video player comprises, in response to identifying the player type of the video player as a mobile media player type, setting the time interval at less than five seconds.

20. The method of claim 18, wherein setting the time interval based on the player type of the video player comprises, in response to identifying the player type of the video player as a set-top box player type, setting the time interval at less than thirty seconds.

* * * * *